(12) United States Patent
Wang et al.

(10) Patent No.: US 10,168,937 B2
(45) Date of Patent: Jan. 1, 2019

(54) STORAGE SPACE ALLOCATION

(71) Applicant: HEWLETT PACKARD ENTERPRISE DEVELOPMENT LP, Houston, TX (US)

(72) Inventors: Jin Wang, Cupertino, CA (US); Roopesh Kumar Tamma, Fremont, CA (US); Siamak Nazari, Mountain View, CA (US); Srinivasa D Murthy, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/513,081

(22) PCT Filed: Sep. 25, 2014

(86) PCT No.: PCT/US2014/057463
§ 371 (c)(1),
(2) Date: Mar. 21, 2017

(87) PCT Pub. No.: WO2016/048325
PCT Pub. Date: Mar. 31, 2016

(65) Prior Publication Data
US 2017/0308315 A1    Oct. 26, 2017

(51) Int. Cl.
*G06F 3/06* (2006.01)
(52) U.S. Cl.
CPC ............ *G06F 3/0631* (2013.01); *G06F 3/064* (2013.01); *G06F 3/0604* (2013.01);
(Continued)
(58) Field of Classification Search
None
See application file for complete search history.

(56) References Cited

U.S. PATENT DOCUMENTS 6,175,900 B1    1/2001  Forin et al.
6,473,775 B1    10/2002 Kusters et al.
(Continued)

FOREIGN PATENT DOCUMENTS

EP     1619585 A2    1/2006

OTHER PUBLICATIONS

Bonwick, J., "Space Maps," (Web Page), Oracle, Sep. 13, 2007, 4 pages, available at https://blogs.oracle.com/bonwick/en/entry/space_maps.
(Continued)

*Primary Examiner* — Kevin Verbrugge
(74) *Attorney, Agent, or Firm* — Hewlett Packard Enterprise Patent Department

(57) ABSTRACT

Example implementations relate to storage space allocation. For example, an implementation includes an apparatus including a controller. The controller is to receive an allocation request from a host computing device. The controller is also to reserve a portion of storage space in the storage device via a reservation table based on the allocation request. The controller is further to determine a type of the allocation request. The type of the allocation request includes a space-optimized allocation request and a non-space-optimized allocation request. When the type of the allocation request corresponds to the non-space-optimized allocation request, the controller is to commit the portion of storage space via an allocation table. When the type of the allocation request corresponds to the space-optimized allocation request, the controller is to release the portion of storage space via the reservation table.

20 Claims, 5 Drawing Sheets

(52) U.S. Cl.
CPC .......... *G06F 3/0608* (2013.01); *G06F 3/0641* (2013.01); *G06F 3/0644* (2013.01); *G06F 3/0673* (2013.01)

(56) References Cited

U.S. PATENT DOCUMENTS

| | | | |
|---|---|---|---|
| 7,290,013 B2 | 10/2007 | Doucette et al. | |
| 8,166,136 B2* | 4/2012 | Tanimura | G06F 17/30017 709/219 |
| 9,483,356 B2* | 11/2016 | Lord | G06F 12/023 |
| 2005/0180430 A1* | 8/2005 | Kawaguchi | H04L 47/2408 370/395.41 |
| 2008/0183777 A1 | 7/2008 | Xi et al. | |
| 2008/0195719 A1* | 8/2008 | Wu | H04L 67/10 709/213 |
| 2010/0169454 A1* | 7/2010 | Tanimura | G06F 17/30017 709/217 |
| 2010/0287216 A1 | 11/2010 | Ylonen | |
| 2011/0167033 A1* | 7/2011 | Strelitz | G06F 17/30312 707/602 |
| 2011/0167034 A1* | 7/2011 | Knight | G06F 17/30312 707/602 |
| 2012/0233438 A1 | 9/2012 | Bak et al. | |
| 2013/0080481 A1 | 3/2013 | Zhou et al. | |
| 2013/0290276 A1 | 10/2013 | Chambliss et al. | |
| 2014/0258671 A1* | 9/2014 | Lord | G06F 12/023 711/171 |
| 2015/0089132 A1* | 3/2015 | Madhusudana | G06F 3/0665 711/114 |
| 2017/0046352 A1* | 2/2017 | Lord | G06F 12/023 |

OTHER PUBLICATIONS

International Search Report & Written Opinion received in PCT Application No. PCT/US2014/057463, dated May 29, 2015, 12 pages.

* cited by examiner

| Storage Space | Reservation Status |
|---|---|
| Block 1 | 1 |
| Block 2 | 0 |
| Block 3 | 0 |

FIG. 3A

| Storage Space | Allocation Status |
|---|---|
| Block 1 | 1 |
| Block 2 | 0 |
| Block 3 | 0 |

FIG. 3B

STORAGE SPACE ALLOCATION

BACKGROUND

A storage device, such as a disk drive or a storage array, may handle read and allocation requests from a host computing device to which the storage device provides service. For a read request, the storage device may retrieve data stored in the storage device and transmit the data to the host computing device. For an allocation request, the storage device may store data received from the host computing device.

BRIEF DESCRIPTION OF THE DRAWINGS

Some examples of the present application are described with respect to the following figures:

FIG. 3A is a reservation table for storage space allocation, according to an example;

FIG. 3B is an allocation table for storage space allocation, according to an example;

DETAILED DESCRIPTION

For a write request, a storage device may store data received from a host computing device. The storage device may allocate a particular portion of storage space as indicated by the allocation request to store data in the allocation request. However, when the allocation request goes through a data deduplication operation or a data compression operation, the amount of data in the allocation request may be reduced as duplicates are removed. Thus, the storage device has over-allocated storage space for the write request. The storage device may deallocate the extra storage space. Thus, an efficiency associated with allocating storage space for an allocation request may be reduced.

Examples described herein provide a storage device to allocate storage space using a reservation table and an allocation table. For example, a storage device may receive an allocation request from a host computing device. The storage device may reserve a portion of storage space via a reservation table based on the allocation request. The storage device may determine a type of the allocation request. When the type of the allocation request corresponds to a non-space-optimized allocation request, the storage device may commit the reserved storage space. When the type of the allocation request corresponds to a space-optimized allocation request, the storage device may release the portion of storage space via the reservation table. The storage device may allocate a portion of storage space as indicated by the space-optimized allocation request. In this manner, examples described herein may increase an efficiency associated with allocating storage space for an allocation request.

Figure 1:
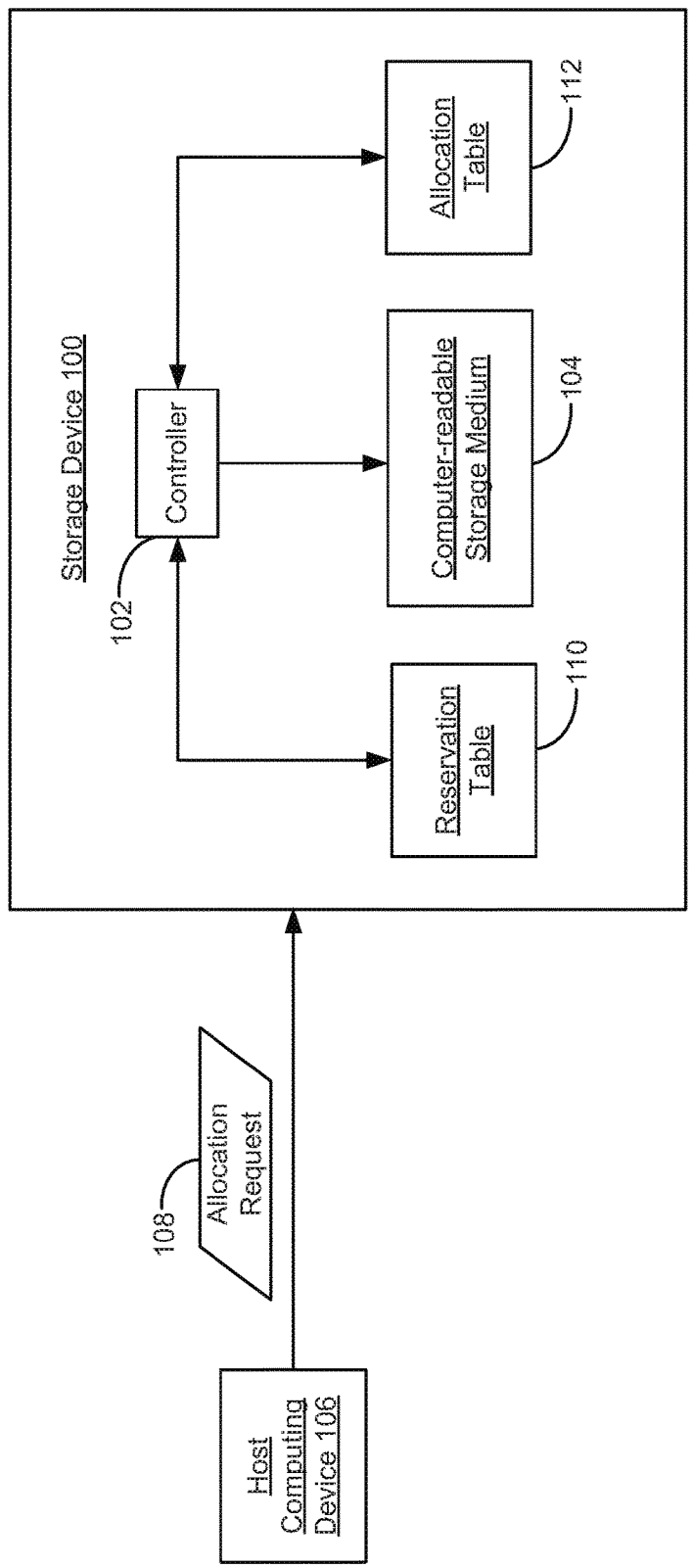
FIG. 1 is a block diagram of a storage device to allocate storage space via a reservation table and an allocation table, according to an example.

Referring now to the figures, FIG. 1 is a block diagram of a storage device 100 to allocate storage space via a reservation table and an allocation table, according to an example. Storage device 100, for example, may be a disk drive, a solid state drive, a non-volatile memory, a volatile memory, a disk array, or any electronic device or circuits suitable to store data. Storage device 100 may include a controller 102 and a computer-readable storage medium 104.

Controller 102 may be a central processing unit (CPU), a semiconductor-based microcontroller, and/or other hardware devices suitable for retrieval and execution of instructions stored in computer-readable storage medium 104. Controller 102 may fetch, decode, and execute instructions to control a process of allocating storage space for an allocation request. As an alternative or in addition to retrieving and executing instructions, controller 102 may include at least one electronic circuit that includes electronic components to perform the process of allocating space for an allocation request.

Computer-readable storage medium 104 may be any electronic, magnetic, optical, or other physical storage device that contains or stores executable instructions and/or data. Thus, computer-readable storage medium 104 may be, for example, Random Access Memory (RAM), an Electrically Erasable Programmable Read-Only Memory (EEPROM), a magnetic disc, etc. In some examples, computer-readable storage medium 204 may be a non-transitory storage medium, where the term "non-transitory" does not encompass transitory propagating signals.

During operation, a host computing device 106 may transmit an allocation request 108 to storage device 100 for storage. Host computing device 106, for example, may be a laptop computer, a smartphone, a tablet computer, a server computer, a desktop computer, or any electronic device suitable to generate data for storage. Allocation request 108 may be a command or an instruction from host computing device 106 to store data. Allocation request 108 may include a particular amount of data to be stored in storage device 100. In some examples, allocation request 108 may correspond to a write request.

In response to receiving allocation request 108, controller 102 may reserve a first portion of storage space in computer-readable storage medium 104 using a reservation table 110. The first portion of storage space may match an initial allocation size of allocation request 108. The initial allocation size may indicate an amount or data in allocation request 108 for storage. Reservation table 110 may be a data structure to indicate the availability of storage space in storage medium. An example of reservation table 110 is described in more detail with reference to FIG. 3A. After reserving the first portion of storage space, controller 102 may acknowledge the receipt of allocation request 108 from host computing device 106. For example, controller 102 may transmit an acknowledgement message (not shown in FIG. 1) to host computing device 106. Thus, by reserving the first portion of storage space via reservation table 110, controller 102 may secure enough storage space to store the data in allocation request 108.

Controller 102 may determine a type of allocation request 108 via a data deduplication operation or a data compression operation. The type of allocation request 108 may include a space-optimized allocation request and a non-space-optimized allocation request. For example, controller 102 may perform a data deduplication operation on allocation request 108. During the data deduplication operation, controller 102 may remove duplicate data chunks (i.e., data chunks already stored in computer-readable storage medium 104) from allocation request 108. Controller 102 may determine a computed allocation size of allocation request 108 via the data deduplication operation. The computed allocation size may indicate the actual amount of data in allocation request 108 for storage after allocation request 108 has been processed by a data deduplication operation or a data compression operation.

When the computed allocation size matches the initial allocation size, allocation request 108 may be a non-space-optimized allocation request since controller 102 is not able to compress or deduplicate the data in allocation request 108 for storage. For example, when any data chunk of the data in allocation request 108 is not a redundant copy of another data chunk stored in computer-readable storage medium 104, controller 102 may not be able to reduce the amount of data in allocation request 108 for storage. When the computed allocation size is less than the initial allocation size, allocation request 108 may be a space-optimized allocation request since controller 102 is able to compress or deduplicate the data in allocation request 108 for storage.

When allocation request 108 is a non-space-optimized allocation request, controller 102 may commit the reserved first portion of storage space in reservation table 110 by allocating the first portion of storage space via an allocation table 112. Allocation table 112 may be a data structure containing allocation information of storage space in computer-readable storage medium 104. An example of allocation table 112 is described in more detail with reference to FIG. 3B.

When allocation request 108 is a space-optimized allocation request, controller 102 may allocate a second portion of storage space via allocation table 112. The second portion of storage space may match the computed allocation size and may be less than the first portion of storage space. Further, controller 102 may release the reserved first portion of storage space via reservation table 110. For example, controller 102 may release the reserved first portion of storage space by changing the reservation status of the first portion of storage space from reserved to available. Thus, the first portion of storage space may become available for reservation for other allocation requests. In some examples, controller may release the reserved first portion of storage space after the second portion of storage space is allocated.

In some examples, controller 102 may allocate the second portion of storage space independent of a prior corresponding reservation in reservation table 110. That is, controller 102 may allocate the second portion of storage space without reserving the second portion of storage space prior to the allocation of the second portion of storage space. The second portion of storage space may be marked as reserved in reservation table 110 after the second portion of storage space is allocated.

In some examples, when allocation request 108 is a space-optimized allocation request, controller 102 may reserve the second portion of storage space after releasing the first portion of storage space. Controller 102 may commit the reserved second portion of storage space based on the computed allocation size.

Thus, by using reservation table 110 and allocation table 112, controller 102 may secure enough storage space to satisfy an allocation request, such as allocation request 108, and avoid over-allocating storage space for the allocation request. An efficiency associated with allocating storage space for an allocation request may be increased.

Figure 2:
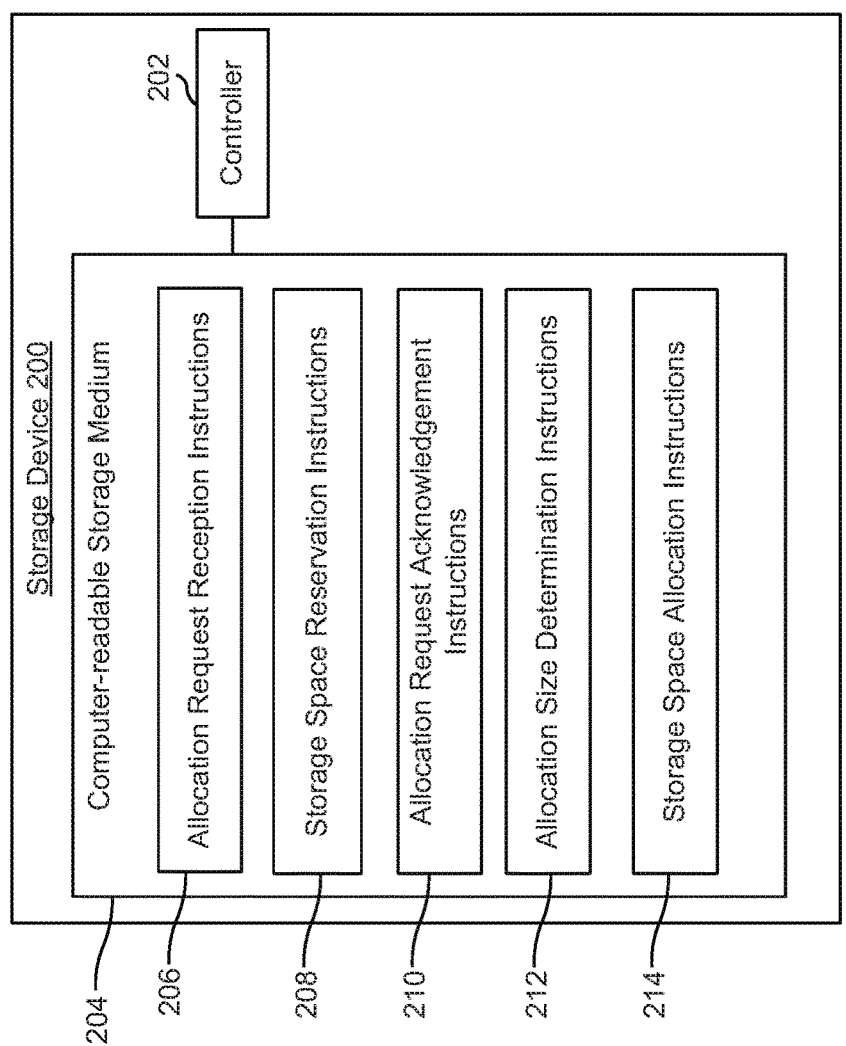
FIG. 2 is a block diagram of a storage device to allocate storage space via a reservation table and an allocation table, according to an example.

FIG. 2 is a block diagram of a storage device 200 to allocate storage space via a reservation table and an allocation table, according to an example. Storage device 200 may be similar to storage device 100 of FIG. 1. Storage device 200 may include a controller 202 and a computer-readable storage medium 204. Controller 202 may be similar to controller 102 of FIG. 1. Computer-readable storage medium 204 may be similar to computer-readable storage medium 104 of FIG. 1. Computer-readable storage medium 204 may be encoded with a series of processor executable instructions 206-214 for storing data in an allocation request using a reservation table and an allocation table.

Allocation request reception instructions 206 may receive an allocation request, such as allocation request 108 in FIG. 1, from a host computing device. Storage space reservation instructions 208 may reserve a portion of storage space in computer-readable storage medium 204 or another storage medium, such as computer-readable storage medium 104, based on an initial allocation size of the allocation request. Allocation request acknowledgement instructions 210 may transmit an acknowledgement message to the host computing device.

Allocation size determination instructions 212 may determine a computed allocation size of the allocation request based on a data deduplication operation or a data compression operation. When the computed allocation size matches the initial allocation size, storage space allocation instructions 214 may commit the portion of storage space reserved in the reservation table by allocating the portion of storage space in an allocation table. When the computed allocation size mismatches the initial allocation size, for example, the computed allocation size is less than the initial allocation size, storage space allocation instructions 214 may release the portion of storage space reserved via the reservation table and allocate another portion of storage space in the allocation table that matches the computed allocation size.

Figures 3A, 3B:
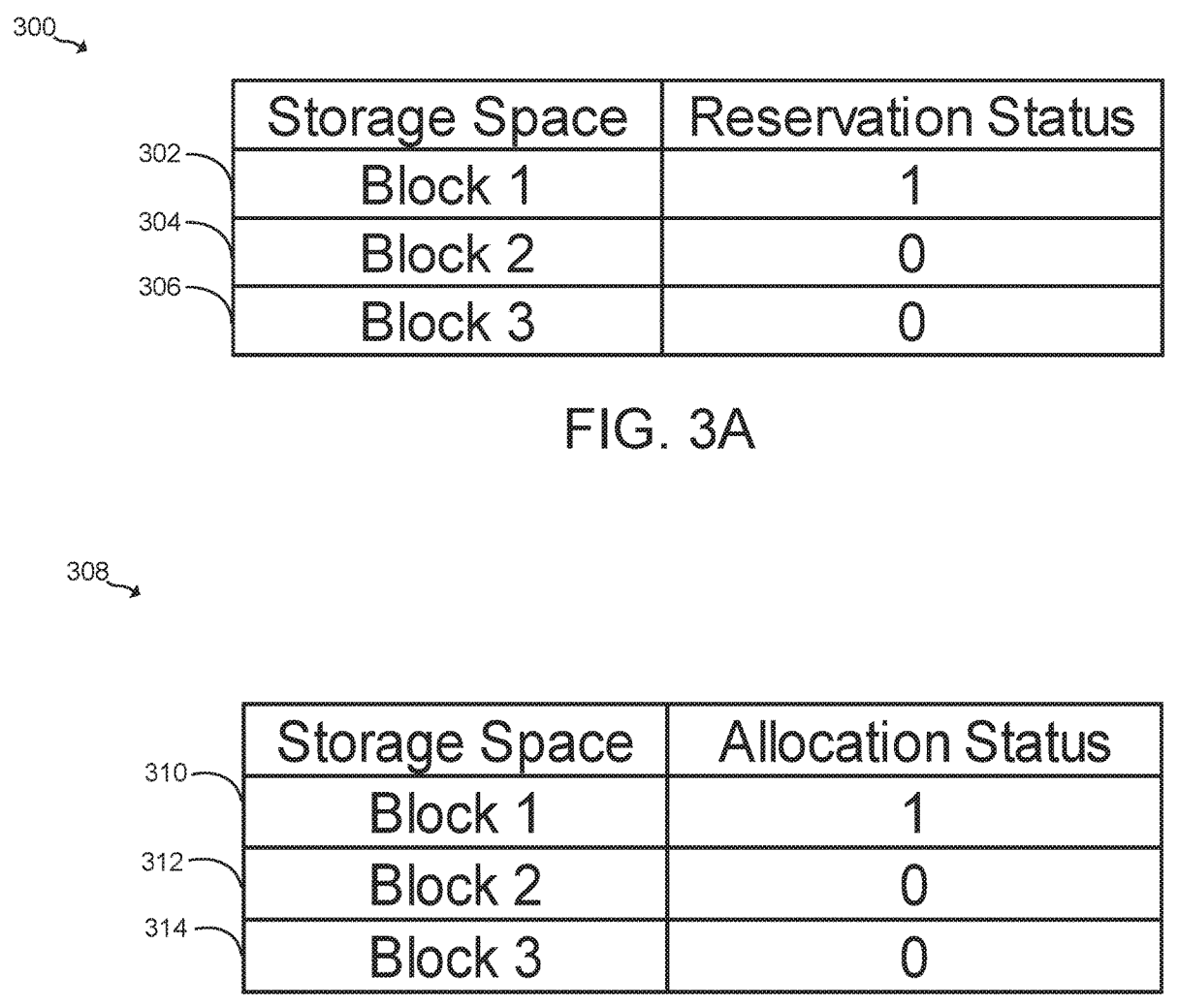

FIG. 3A is a reservation table 300 for storage space allocation, according to an example. Reservation table 300 may be used to implement reservation table 110 in FIG. 1. In some examples, reservation table 300 may be implemented as a bitmap. Reservation table 300 may include a plurality of rows where each row indicates a reservation status of a distinct block in a storage medium, such as computer-readable storage medium 104 of FIG. 1 or computer-readable storage medium 204 of FIG. 2. For example, reservation table 300 may include rows 302-306.

Row 302 may indicate a reservation status of Block 1, row 304 may indicate a reservation status of Block 2, and row 306 may indicate a reservation status of Block 3. As shown in FIG. 3A, a reservation bit of Block 1 in row 302 may be set to a value 1 to indicate that Block 1 is reserved. For example, controller 102 of FIG. 1 may set the value of the reservation bit. When Block 1 is committed, the value of the reservation bit may remain at until Block is deallocated. When Block 1 is released, the value of the reservation bit may be set to 0 to indicate that Block 1 is available for reservation. As shown in FIG. 3A, reservation bits of Block 2 and Block 3 are set to a value 0 to indicate that Block 2 and Block 3 are available for reservation FIG. 3B is an allocation table 308 for storage space allocation, according to an example. Allocation table 308 may be used to implement allocation table 112 of FIG. 1. Allocation table 308 may include a plurality of rows where each row indicates an allocation status of a distinct block in a storage medium, such as computer-readable storage medium 104 of FIG. 1 or computer-readable storage medium 204 of FIG. 2. For example, allocation table 308 may include rows 310-314. In some examples, a block in allocation table 308 may have a corresponding entry in reservation table 300 so that the block may not be reserved when the block is allocated. For example, Block 1 in row 310 may have a corresponding entry row 302 in reservation table 300.

As shown in FIG. 3B, an allocation bit of Block 1 in row 310 may be set to a value 1 to indicate that Block 1 is allocated. Allocation bits of Block 2 and Block 3 in rows 312 and row 314, respectively, may be set to a value 0 to indicate that block 2 and block 3 are unallocated. In some examples, the value of a reservation bit of a block may be set automatically based on a value of a corresponding allocation bit of the block. For example, when Block 2 is allocated without a prior corresponding reservation in reservation table 300, the value of the allocation bit may be changed to 1 and the value of the reservation bit in row 304 of reservation table 300 may be changed to 1.

Figure 4:
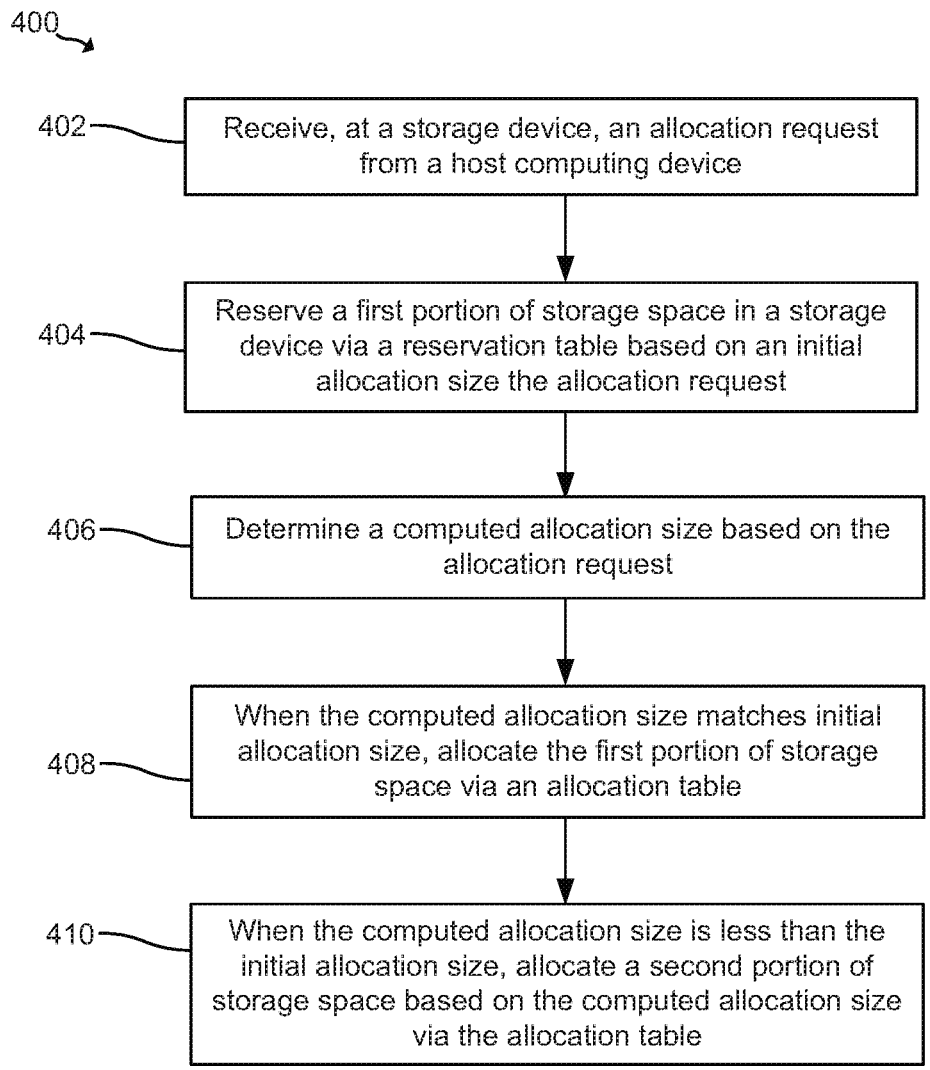
FIG. 4 is a flowchart illustrating a method of allocating storage space via a reservation table and an allocation table, according to an example.

FIG. 4 is a flowchart illustrating a method 400 of allocating storage space via a reservation table and an allocation table, according to an example. Method 400 may be implemented using storage device 100 of FIG. 1 and/or storage device 200 of FIG. 2. Method 400 includes receiving, at a storage device, an allocation request from a host computing device, at 402. For example, referring to FIG. 1, storage device 100 may receive allocation request 108 from host computing device 106. Method 400 also includes reserving a first portion of storage space in the storage device via a reservation table based on an initial allocation size the allocation request. For example, referring to FIG. 1, controller 102 may reserve the first portion of storage space via reservation table 110 based on the initial allocation size of allocation request 108.

Method 400 further includes determining a computed allocation size based on the allocation request, at 406. For example, referring to FIG. 1, controller 102 may determine the computed allocation size of allocation request 108 via a data deduplication operation on allocation request 108. When the computed allocation size matches the initial allocation size, method 400 includes allocating the first portion of storage space via an allocation table, at 408. For example, referring to FIG. 1, controller 102 may commit the reserved first portion of storage space in reservation table 110 by allocating the first portion of storage space via allocation table 112.

When the computed allocation size is less than the initial allocation size, method 400 further includes allocating a second portion of storage space via the allocation table, wherein the second portion is less than the first portion, at 410. For example, referring to FIG. 1, controller 102 may allocation a second portion of storage space via allocation table 112. The second portion of storage space may match the computed allocation size and may be less than the first portion of storage space.

Figure 5:
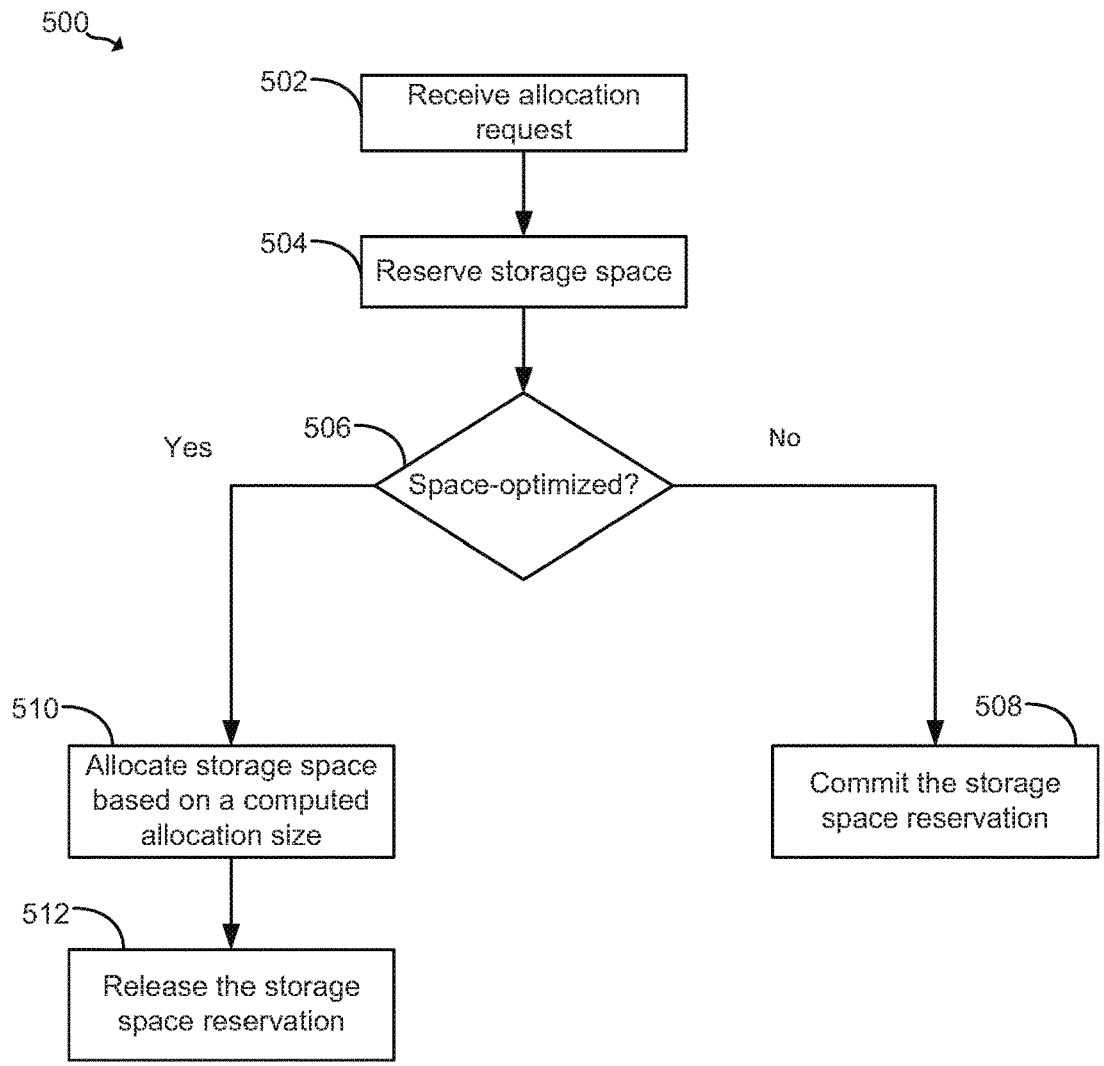
FIG. 5 is a flowchart illustrating a method of allocating storage space via a reservation table and an allocation table, according to an example.

FIG. 5 is a flowchart illustrating a method 500 of allocating storage space via a reservation table and an allocation table, according to an example. Method 500 may be implemented using storage device 100 of FIG. 1 and/or storage device 200 of FIG. 2. Method 500 includes receiving an allocation request, at 502. For example, referring to FIG. 1, storage device 100 may receive allocation request 108 from host computing device 106.

Method 500 also includes reserving storage space, at 504. For example, referring to FIG. 1, controller 102 may reserve the first portion of storage space via reservation table 110 based on the initial allocation size of allocation request 108. Method 500 further includes determining whether the allocation request is non-space-optimized allocation request or a space-optimized allocation request, at 506. For example, referring to FIG. 1, controller 102 may determine a type of allocation request 108 via a data deduplication operation or a data compression operation. The type of allocation request 108 may include a space-optimized allocation request and a non-space-optimized allocation request.

When the allocation request is a non-space-optimized allocation request, method 500 further includes committing the storage space reservation, at 508. For example, referring to FIG. 1, controller 102 may commit the reserved first portion of storage space in reservation table 110 by allocating the first portion of storage space via an allocation table 112.

When the allocation request is a space-optimized allocation request, method 500 further includes allocating storage space based on a computed allocation size, at 510. For example, referring to FIG. 1, controller 102 may allocation a second portion of storage space via allocation table 112. The second portion of storage space may match the computed allocation size and may be less than the first portion of storage space. Method 500 further includes releasing the storage space reservation, at 512. For example, referring to FIG. 1, controller 102 may release the reserved first portion of storage space by changing the reservation status of the first portion of storage space from reserved to available.

According to the foregoing, examples disclosed herein provide a storage device to allocate storage space for an allocation request via a reservation table and an allocation table. Based on an initial allocation size of an allocation request, a storage device may reserve a first portion of storage space via a reservation table. The storage device may determine a type of the allocation request. When the allocation request is a non-space-optimized allocation request, the storage device may commit the storage space reservation by allocating the first portion of storage space via an allocation table. When the allocation request is a space-optimized allocation request, the storage device may release the storage space reservation and allocate a second portion of storage space that is less than the first portion of storage space. The second portion of storage space indicate an actual allocation size of the allocation request determined via a data deduplication operation or a data compression operation. Thus, over-allocation of storage space may be avoided and an efficiency associated with allocating storage space for an allocation request may be increased.

The use of "comprising", "including" or "having" are synonymous and variations thereof herein are meant to be inclusive or open-ended and do not exclude additional unrecited elements or method steps.

What is claimed is:

1. An apparatus comprising:
   a non-transitory computer-readable storage medium comprising instructions; and
   a controller, wherein the instructions are executable by the controller to:
   receive an allocation request from a host computing device;
   reserve a portion of storage space in a storage device via a reservation table based on the allocation request;
   determine a type of the allocation request, among types including a space-optimized allocation request and a non-space-optimized allocation request;
   in response to a determination that the type of the allocation request corresponds to the non-space-optimized allocation request, commit the portion of storage space via an allocation table; and
   in response to a determination that the type of the allocation request corresponds to the space-optimized allocation request, release the portion of storage space via the reservation table.

2. The apparatus of claim 1, wherein the allocation request has an initial allocation size, wherein the type of the allocation request is the space-optimized allocation request when a computed allocation size of the allocation request is less than the initial allocation size.

3. The apparatus of claim 1, wherein the allocation request has an initial allocation size, wherein the type of the allocation request is the non-space-optimized allocation request when a computed allocation size of the allocation request matches the initial allocation size.

4. The apparatus of claim 3, wherein the computed allocation size is determined via a data compression operation.

5. The apparatus of claim 1, wherein the controller is further to transmit an acknowledgement message of the allocation request to the host computing device after reserving the portion of storage space via the reservation table.

6. The apparatus of claim 1, wherein the instructions are executable by the controller to:
in response to a determination that the type of the allocation request corresponds to the space-optimized allocation request, allocate a second portion of storage space via the allocation table, wherein the second portion is smaller than the first portion.

7. The apparatus of claim 1, wherein the computed allocation size is determined via a data deduplication operation on the allocation request.

8. A method comprising:
receiving, at a storage device, an allocation request from a host computing device;
reserving a first portion of storage space in the storage device via a reservation table based on an initial allocation size of the allocation request;
determining a computed allocation size based on the allocation request; and
based on the computed allocation size being less than the initial allocation size;
allocating a second portion of storage space via the allocation table, wherein the second portion is smaller than the first portion; and
releasing the first portion of storage space via the reservation table.

9. The method of claim 8, wherein the computed allocation size is determined via a data deduplication operation on the allocation request.

10. The method of claim 8, further comprising transmitting an acknowledgement message of the allocation request to the host computing device after reserving the portion of storage space via the reservation table.

11. The method of claim 8, further comprising:
reserving the second portion of storage space via the reservation table after allocating the second portion of storage space via the allocation table.

12. The method of claim 8, wherein the computed allocation size is determined via a data compression operation.

13. The method of claim 8, further comprising:
receiving, at the storage device, another allocation request from the host computing device;
reserving a third portion of storage space in the storage device via the reservation table based on another initial allocation size of the another allocation request;
determining another computed allocation size based on the another allocation request; and
based on the another computed allocation size matching the another initial allocation size, allocating the third portion of storage space via the allocation table.

14. A non-transitory computer-readable storage medium comprising instructions that executed cause a controller of a storage device to:
receive an allocation request from a host computing device;
reserve a first portion of storage space in the storage device via a reservation table based on an initial allocation size of the allocation request;
in response to a reservation of the first portion of storage space, transmit an acknowledgement of the allocation request to the host computing device;
determine a computed allocation size based on the allocation request;
based on the computed allocation size matching the initial allocation size, allocate the first portion of storage space via an allocation table; and
based on the computed allocation size being less than the initial allocation size, allocate a second portion of storage space based on the computed allocation size via the allocation table.

15. The non-transitory computer-readable storage medium of claim 14, wherein the instructions when executed further cause the controller to release the first portion of storage space via the reservation table based on the computed allocation size being less than the initial allocation size.

16. The non-transitory computer-readable storage medium of claim 14, wherein an allocation of the second portion of storage space is independent of a prior corresponding reservation in the reservation table.

17. The non-transitory computer-readable storage medium of claim 14, wherein the computed allocation size is determined via a data compression operation on the allocation request.

18. The non-transitory computer-readable storage medium of claim 14, wherein when the computed allocation size matches the initial allocation size, the allocation request corresponds to a non-space-optimized allocation request, and wherein when the computed allocation size is less than the initial allocation size, the allocation request corresponds to a space-optimized allocation request.

19. The non-transitory computer-readable storage medium of claim 14, wherein the instructions when executed further cause the controller to reserve the second portion of storage space via the reservation table after allocating the second portion of storage space via the allocation table.

20. The non-transitory computer-readable storage medium of claim 14, wherein the computed allocation size is determined via a data deduplication operation on the allocation request.

* * * * *